(12) United States Patent
Hashimoto et al.

(10) Patent No.: US 11,701,770 B2
(45) Date of Patent: Jul. 18, 2023

(54) ROBOT SYSTEM AND METHOD OF CONTROLLING ROBOT SYSTEM

(71) Applicant: KAWASAKI JUKOGYO KABUSHIKI KAISHA, Kobe (JP)

(72) Inventors: Yasuhiko Hashimoto, Kobe (JP); Nobuyasu Shimomura, Kobe (JP); Masayuki Kamon, Akashi (JP); Jun Fujimori, Himeji (JP); Hiroki Kinoshita, Akashi (JP); Takuya Shitaka, Kakogawa (JP); Hiroki Takahashi, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 373 days.

(21) Appl. No.: 16/614,987

(22) PCT Filed: May 17, 2018

(86) PCT No.: PCT/JP2018/019018
§ 371 (c)(1),
(2) Date: Nov. 19, 2019

(87) PCT Pub. No.: WO2018/212259
PCT Pub. Date: Nov. 22, 2018

(65) Prior Publication Data
US 2020/0198120 A1     Jun. 25, 2020

(30) Foreign Application Priority Data
May 19, 2017   (JP) ................................ 2017-100385

(51) Int. Cl.
*B25J 3/04* (2006.01)
*B25J 9/16* (2006.01)
(Continued)

(52) U.S. Cl.
CPC ................. *B25J 3/04* (2013.01); *B25J 9/163* (2013.01); *B25J 9/1648* (2013.01); *B25J 9/1687* (2013.01);
(Continued)

(58) Field of Classification Search
CPC ... B25J 3/04; B25J 9/163; B25J 9/1648; B25J 9/1687; B25J 13/025; B25J 13/085; B25J 19/02; B25J 19/06
See application file for complete search history.

(56) References Cited

U.S. PATENT DOCUMENTS

2007/0112466 A1 *   5/2007   Ohnishi ................. G05B 19/19
                                                            700/260
2009/0062813 A1 *   3/2009   Prisco .................... A61B 34/37
                                                            606/130
(Continued)

FOREIGN PATENT DOCUMENTS

EP            A0440202 A2 *   1/1990
EP            0 440 202 A2    8/1991
(Continued)

*Primary Examiner* — Khoi H Tran
*Assistant Examiner* — Tristan J Greiner
(74) *Attorney, Agent, or Firm* — Oliff PLC

(57) ABSTRACT

A robot system includes a manipulating force detector configured to detect a manipulating force given to an operation end by an operator, a reaction-force detector configured to detect a reaction force given to a work end or a workpiece held by the work end, a system controller configured to generate an operating command of a master arm and generate an operating command of a slave arm based on the manipulating force and the reaction force, a master-side control part configured to control the master arm, and a slave-side control part configured to control the slave arm. The system controller has an exaggerated expresser configured to exaggeratedly present an operating feel to the
(Continued)

operator who operates the operation end in a reaction-force sudden change state that is a state in which the reaction force changes rapidly with time.

20 Claims, 6 Drawing Sheets

(51) Int. Cl.
  *B25J 13/02* (2006.01)
  *B25J 13/08* (2006.01)
  *B25J 19/02* (2006.01)
(52) U.S. Cl.
  CPC ........... *B25J 13/025* (2013.01); *B25J 13/085* (2013.01); *B25J 19/02* (2013.01)

(56) References Cited

U.S. PATENT DOCUMENTS

| | | | |
|---|---|---|---|
| 2012/0328395 A1* | 12/2012 | Jacobsen | F41H 7/005 414/1 |
| 2015/0360365 A1* | 12/2015 | Fudaba | B25J 9/1679 700/254 |
| 2017/0050310 A1* | 2/2017 | Kanaoka | B25J 13/088 |
| 2018/0071915 A1* | 3/2018 | Khatib | B25J 9/1656 |
| 2020/0015916 A1* | 1/2020 | Schwab | A61B 34/30 |

FOREIGN PATENT DOCUMENTS

| | | |
|---|---|---|
| JP | S60-177883 A | 9/1985 |
| JP | 60177883 A * | 11/1985 |
| JP | H10-202558 A | 8/1998 |
| WO | 2012/149435 A2 | 11/2012 |
| WO | 2017/033378 A1 | 3/2017 |

\* cited by examiner

ROBOT SYSTEM AND METHOD OF CONTROLLING ROBOT SYSTEM

TECHNICAL FIELD

The present disclosure relates to a robot system and a method of controlling the robot system.

BACKGROUND ART

Master-slave type robot systems used for a detailed work, etc. have been developed. In this system, an operator can perform a work with a slave arm by manipulating a master arm, without the operator directly performing the work. For example, Patent Document 1 discloses a robot system of a bilateral-control type. Generally, the bilateral control is a control method which simultaneously performs an attitude control from the master arm to the slave arm, and a force control from the slave arm to the master arm. In such a system, the working efficiency is improved by transmitting to the operator through the master arm, reaction-force information which the slave arm receives from a work object or a work environment.

REFERENCE DOCUMENT OF CONVENTIONAL ART

Patent Document

[Patent Document 1] JP1998-202558A

DESCRIPTION OF THE DISCLOSURE

Problems to be Solved by the Disclosure

However, in the robot system of the conventional bilateral-control type, when the response to the reaction force is raised, the sense is easier to be transmitted to the operator, but the control system becomes unstable. Therefore, for an actual use, the response to the reaction force must be lowered. In this case, although the operation of the robot becomes stable and it becomes easy to operate the robot, it becomes difficult to transmit to the operator, for example, the sense of a hit of the robot with something, and the sense of exploring by the robot while pressing against something. Moreover, if the tactile sense is tried to be reproduced, additional sensors for detecting the senses will be needed. Such a problem is common to a master-slave type robot system provided with a force sensor at least at a tip end of a slave arm.

The present disclosure is made in view of solving the above problem, and one purpose thereof is to improve an operation feel in a master-slave type robot system, without providing an additional sensor for detecting a sense.

SUMMARY OF THE DISCLOSURE

In order to achieve the purpose, a robot system according to one aspect of the present disclosure includes a master arm having an operation end, a slave arm having a work end, a manipulating force detector configured to detect a manipulating force given to the operation end by an operator, a reaction-force detector configured to detect a reaction force given to the work end or a workpiece held by the work end, a system controller configured to generate an operating command of the master arm and generate an operating command of the slave arm based on the manipulating force and the reaction force, a master-side control part configured to control the master arm based on the operating command of the master arm generated by the system controller, and a slave-side control part configured to control the slave arm based on the operating command of the slave arm generated by the system controller. The system controller has an exaggerated expresser configured to exaggeratedly present an operating feel to the operator who operates the operation end in a reaction-force sudden change state that is a state in which the reaction force changes rapidly with time.

According to this configuration, in the robot system of the master-slave type, in the reaction-force sudden change state that is a state in which the reaction force given to the work end (or the workpiece held by the work end) changes rapidly with time, the operating feel is exaggeratedly presented to the operator who operates the operation end. Thus, for example, the operator can recognize that the work end of the slave arm contacted the object.

The exaggerated expresser may generate a correction component to correct the operating command of the master arm generated by the system controller based on the reaction force in the reaction-force sudden change state.

According to this configuration, in a bilateral control in which the operating command of the master arm and the operating command of the slave arm are generated based on the manipulating force and the reaction force, the correction component to correct the operating command of the master arm is generated based on the reaction force of the slave arm in the reaction force sudden change state. Thus, since the reaction force is reflected in the operating command of the master arm, the operator can recognize that the work end of the slave arm contacted the object. Therefore, the fine sense at high frequency can be presented in the bilateral control.

Note that, the correction component may be a triangular wave component. To the operator who operates the master arm, the sense of the work end of the slave arm hitting a hard object can be exaggeratedly presented.

Moreover, the correction component may be a sine wave component. To the operator who operates the master arm, the sense of the work end of the slave arm hitting a soft object can be exaggeratedly presented.

Moreover, the correction component may be a second order derivative value of the reaction force with respect to time. To the operator who operates the master arm, the sense of the work end of the slave arm hitting an object actually can be exaggeratedly presented.

The operating command may be a positional instruction. According to this configuration, in a parallel type bilateral control in which the operating command of the master arm and the operating command of the slave arm are generated based on the manipulating force and the reaction force, the operation feel can be exaggeratedly presented to the operator.

The system controller may further include a positional offset compensator configured to generate a compensation component to compensate the positional instruction of the master arm based on positional information on the slave arm, and positional information on the master arm considering the correction component.

According to this configuration, in the parallel type bilateral control, the offset in the spatial relationship between the master arm and the slave arm caused by the exaggerated expresser can be compensated gradually. Since the master arm is compensated while moving slowly after the operating feel is exaggeratedly presented so that the operator does not sense any uncomfortableness, it does not affect the operation of the master arm.

The robot system may further include a memory storing classified work states, positional information on the slave arm, the manipulating force, and the reaction force in a particular work of the robot system are collected as data, and one or more work states are classified according to the collected data. The exaggerated expresser may further include a work state determinator configured to determine, during operation of the robot system, in which work state stored in the memory a current work state is classified based on at least one value among the positional information on the slave arm, the manipulating force, and the reaction force.

According to this configuration, the operator can recognize that the work end of the slave arm contacted the object, and also accurately recognize the state of the work which is started after the contact. For example, the reaction-force sudden change state may be taken as in the state where the work is started.

The work state determinator may determine, during the operation of the robot system, that a work state in which the reaction force occurs in a given direction and the manipulating force occurs in a direction perpendicular to the given direction is a state where an object is searched.

The work state determinator may determine, during the operation of the robot system, that the work state is a state where the workpiece held by the work end is inserted into the object when the positional information on the slave arm is located in a given direction from a given position, and the reaction force varies.

The exaggerated expresser may further include a work state presenter configured to present the operator the work state by at least one of sound, vibration of the master arm, and light.

Effect of the Disclosure

The present disclosure has the configuration described above, and can improve the operation feel in the master-slave type robot system, without providing the additional sensor for detecting the sense.

MODES FOR CARRYING OUT THE DISCLOSURE

Figure 1:
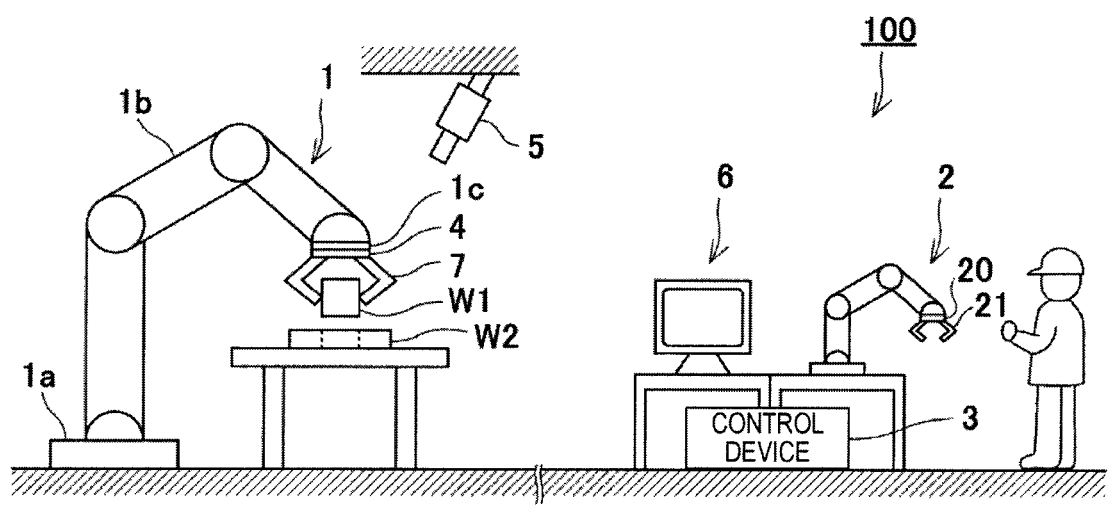
FIG. 1 is a view illustrating the entire configuration of a robot system according to a first embodiment of the present disclosure.

Hereinafter, desirable embodiments will be described with reference to the drawings. Note that, below, the same or corresponding components are denoted with the same reference characters throughout the drawings to omit redundant description. Moreover, the drawings are to illustrate each component schematically for easier understandings.

First Embodiment

FIG. 1 is a schematic diagram illustrating one example of configuration of the robot system according to a first embodiment of the present disclosure. As illustrated in FIG. 1, a robot system 100 of this embodiment is configured so that a slave arm 1 is remotely controlled by a master arm 2. The robot system 100 is a remote control system of a master-slave type.

The robot system 100 includes the slave arm 1 comprised of a first robot, the master arm 2 comprised of a second robot, a control device 3, a force sensor 4, a camera 5, and a monitor 6. The slave arm 1 may be comprised of an arbitrary type of robot. In this embodiment, the slave arm 1 is comprised of, for example, a well-known articulated robot, and includes a pedestal 1a, an articulated arm 1b provided to the pedestal 1a, and a wrist 1c provided to a tip end of the arm 1b. A coordinate system on the basis of an upper surface of the pedestal 1a is referred to as a base coordinate system of the slave arm 1. Each joint of the articulated arm 1b includes a driving servo motor, an encoder which detects a rotational angle position of the servo motor, and a current sensor which detects current which flows into the servo motor (none of them is illustrated). An end effector 7 is attached to the wrist 1c. The end effector 7 corresponds to a "work end" of the present disclosure. The end effector 7 is a robot hand which can grip a workpiece. The end effector 7 includes a hand body (not illustrated) attached to a tip end of the wrist 1c, and two finger parts driven by an actuator (not illustrated) comprised of a motor, for example. When the actuator is operated, the two finger parts move with respect to the hand body. The two finger parts of the hand are movable so as to approach or separate to/from each other by operation of the master arm 2, and are capable of gripping a fitting component W1.

The force sensor 4 is attached to the wrist 1c of the slave arm 1. The force sensor 4 detects a reaction force given to the workpiece held by the end effector 7. The force sensor 4 corresponds to a "reaction-force detector" of the present disclosure. In this embodiment, the force sensor 4 is attached to a base end of the end effector 7, and is configured to detect a force applied to the tip end of the end effector 7. For example, the force sensor 4 is a 6-axis force sensor capable of detecting forces in the XYZ-axis directions defined by a wrist coordinate system, and a moment which acts on each axis. Here, the wrist coordinate system is a coordinate system on the basis of the wrist 1c. In this embodiment, when the fitting component W1 which is the workpiece held by the end effector 7 contacts a to-be-fitted component W2 which is a target object, the force sensor 4 is configured to detect a direction and a magnitude of a reaction force which acts on the fitting component W1 in the base coordinate system of the slave arm 1, and transmit a detection signal to the control device 3 wirelessly or wiredly.

The master arm 2 may be comprised of an arbitrary type of robot. In this embodiment, the master arm 2 has a similar structure to the slave arm 1. That is, the master arm 2 is comprised of an articulated robot similar to the slave arm 1, and a base coordinate system of the master arm 2 is defined on the basis of an upper surface of a pedestal of the master arm 2. Each joint of the articulated arm includes a driving servo motor, an encoder which detects a rotational angle position of the servo motor, and a current sensor which detects current which flows into the servo motor (none of them is illustrated). A control lever 21 which imitates the shape of the end effector 7 at the tip end of the slave arm 1 is attached to the tip end of the master arm 2. The control lever 21 corresponds to an "operation end" of the present disclosure. Note that the "operation end" may be, for example, a switch, an adjustment knob, or a mobile terminal, such as a tablet, or may be a simple device, such as a control lever, as long as it has a configuration in which the slave arm 1 can be manipulated by the operation of the operator. A force sensor 20 is attached to the control lever 21. The force sensor 20 detects a manipulating force given to the control lever 21 by the operator. The force sensor 20 corresponds to a "manipulating force detector" of the present disclosure. In this embodiment, the force sensor 20 is attached to a base end of the control lever 21, and it is configured to detect a force applied to the tip end of the control lever 21. For example, the force sensor 20 is a 6-axis force sensor capable of detecting forces in the XYZ-axis directions defined by a wrist coordinate system of the master arm 2, and a moment which acts on each axis. Here, the wrist coordinate system is a coordinate system on the basis of a wrist of the master arm 2. In this embodiment, when the operator operates the control lever 21 to manipulate the slave arm 1, the force sensor 20 detects the direction and the magnitude of the manipulating force applied to the control lever 21 by the operator in the base coordinate system of the master arm 2, and transmits the detection signal to the control device 3 wirelessly or wiredly as operational information.

The camera 5 is provided to be imagable of operation of the slave arm 1 within a part or all of a movable range of the slave arm 1. Image information imaged by the camera 5 is transmitted to the control device 3, and the control device 3 controls the monitor 6 to display an image corresponding to the image information.

In the robot system 100, the operator who is present at the position distant from the workspace of the slave arm 1 (outside of the work area) gives a desired manipulating force to the control lever 21 of the master arm 2, as an input of the operational information, while looking at the image of the camera 5 projected on the monitor 6. According to the manipulating force, the slave arm 1 operates together with the master arm 2, and can perform a particular work. The particular work is a work, for example, in which the fitting component W1 which is the workpiece held by the end effector 7 is fitted into a hole of the to-be-fitted component W2 which is the target object. This work requires skill of the operator among the assembly operation.

Moreover, in the robot system 100, the slave arm 1 can also perform a given work automatically without the manipulation of the master arm 2 by the operator. Herein, an operating mode to operate the slave arm 1 according to the operational information inputted through the master arm 2 is referred to as a "manual mode." Note that the "manual mode" also includes a case where a part of the operation of the slave arm 1 under operation is automatically compensated based on the operational information inputted by the operator operating the master arm 2. Moreover, an operating mode to operate the slave arm 1 according to a given program set beforehand is referred to as an "automatic mode." Further, the robot system 100 of this embodiment is configured to be able to correct operation to be carried out automatically by reflecting the operation of the master arm 2 in the automatic operation of the slave arm 1, while the slave arm 1 operates automatically. Herein, an operating mode to operate the slave arm 1 according to a given program set beforehand in a state in which the operational information inputted through the master arm 2 can be reflected is referred to as a "corrected automatic mode." Note that the "automatic mode" described above is distinguished from the "corrected automatic mode" in that the operation of the master arm 2 is not reflected in the operation of the slave arm 1 when the operating mode in which the slave arm 1 is operated is the automatic mode. Below, the robot system 100 of this embodiment operates in the "manual mode" unless otherwise particularly described.

Figure 2:
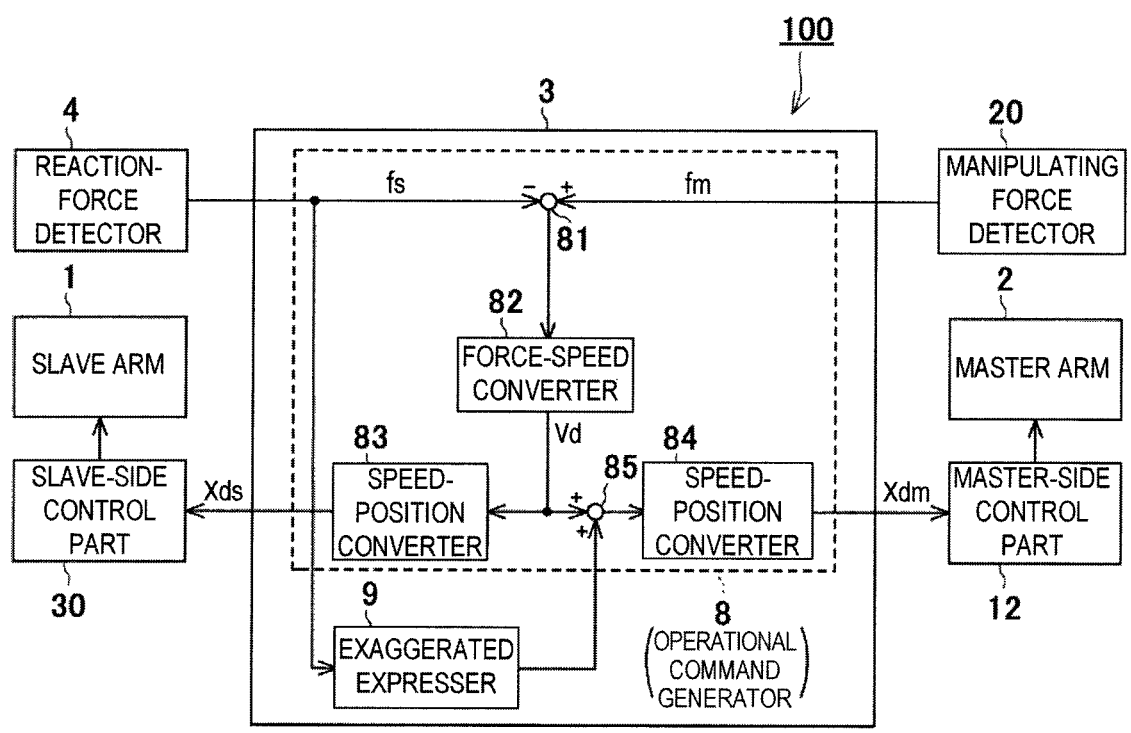
FIG. 2 is a block diagram illustrating a configuration of a control system of the robot system of FIG. 1.

FIG. 2 is a block diagram illustrating a configuration of a control system of the robot system 100. As illustrated in FIG. 2, the control device 3 includes an operational command generator 8, an exaggerated expresser 9, and an interface (not illustrated). In this embodiment, the control device 3 is connected to an input device (not illustrated). The input device is comprised of a human-machine interface, such as a touch panel or a keyboard, and it is mainly used for inputting a mode change between the "automatic mode," the "corrected automatic mode," and the "manual mode" of the slave arm 1, various data, etc. The control device 3 is comprised of a device having an arithmetic processing capability, such as a calculator, a microcontroller, and a microprocessor, and a memory. Each function of the operational command generator 8 and the exaggerated expresser 9 is implemented by the given program stored in the memory of the control device 3 being executed by an arithmetic processor (not illustrated) of the control device 3. Moreover, the control device 3 of this embodiment also has a function of a monitor controller which displays the image corresponding to the image information imaged by the camera 5. The control device 3 is arbitrary in the hardware configuration, and the control device 3 may be provided separately from other devices, such as the slave arm 1, or may be provided integrally with other devices. The robot system 100 of this embodiment is a master-slave type robot system according to a parallel type bilateral control. A manipulating force $f_m$ detected by the force sensor 20 of the master arm 2 and a reaction force $f_s$ detected by the force sensor 4 of the slave arm 1 are inputted into the control device 3.

The operational command generator 8 generates an operating command for the slave arm 1 (hereinafter, referred to as the "slave operating command") and an operating command for the master arm 2 (hereinafter, referred to as the "master operating command") based on the manipulating force $f_m$ detected by the force sensor 20 of the master arm 2, and the reaction force $f_s$ detected by the force sensor 4 of the slave arm 1. In this embodiment, the slave operating command is a positional instruction for the servo motor which drives each joint axis of the slave arm 1, defined in the base coordinate system of the slave arm 1. The master operating command is a positional instruction for the servo motor which drives each joint axis of the master arm 2 defined in the base coordinate system of the master arm 2. The master operating command is generated so that the control lever 21 is moved in the same direction as the moving direction of the end effector 7 by the slave operating command That is, the slave arm 1 and the master arm 2 operate similarly.

In detail, the operational command generator 8 includes an adder/subtractor 81, a force-speed converter 82, a speed-position converter 83 (slave side), a speed-position converter 84 (master side), and an adder/subtractor 85. Each of the components 81-85 is implemented by the given program stored in the memory (not illustrated) of the control device 3 being executed by the arithmetic processor (not illustrated) of the control device 3.

The adder/subtractor 81 subtracts the reaction force $f_s$ detected by the force sensor 4 of the slave arm 1 from the manipulating force $f_m$ detected by the force sensor 20 of the master arm 2, and outputs it to the force-speed converter 82.

The force-speed converter 82 generates a speed instruction value $v_d$ based on a difference between the manipulating force $f_m$ and the reaction force $f_s$ which are inputted from the adder/subtractor 81, and outputs it to the speed-position converter 83 (slave side) and the adder/subtractor 85.

The speed-position converter 83 (slave side) generates a positional instruction value $x_{ds}$ of the slave arm 1 based on the speed instruction value $v_d$, and outputs it to a slave-side control part 30. The slave-side control part 30 is, for example, a robot controller configured to carry out a position control of the slave arm 1. The slave-side control part 30 generates a speed instruction value based on a deviation of a detection value (actual value) of the encoder (not illustrated) from the positional instruction value of each joint axis of the slave arm 1. Then, a torque instruction value (current instruction value) is generated based on a deviation of a present speed value from the generated speed instruction value, and the servo motor is controlled based on a deviation of a detection value (actual value) of the current sensor from the generated current instruction value.

The speed-position converter 84 (master side) generates a positional instruction value $x_{dm}$ of the master arm 2 based on the speed instruction value $v_d$, and outputs it to a master-side control part 12. The master-side control part 12 is, for example, a robot controller configured to carry out a position control of the master arm 2. The master-side control part 12 generates a speed instruction value based on a deviation of the detection value (actual value) of the encoder (not illustrated) from the positional instruction value of each joint axis of the master arm 2. Then, a torque instruction value (current instruction value) is generated based on a deviation of the present speed value from the generated speed instruction value, and the servo motor is controlled based on a deviation of a detection value (actual value) of the current sensor from the generated current instruction value.

The exaggerated expresser 9 is configured to present an operating feel in an exaggerated manner to the operator who operates the control lever 21 in a reaction-force sudden change state in which the reaction force $f_s$ detected by the force sensor 4 of the slave arm 1 changes rapidly with time. In detail, in the reaction-force sudden change state, the exaggerated expresser 9 generates a correction component for correcting the positional instruction value $x_{dm}$ of the master arm 2 based on the reaction force $f_s$, and outputs it to the adder/subtractor 85.

The adder/subtractor 85 adds the correction component generated by the exaggerated expresser 9 to the speed instruction value $v_d$ generated by the force-speed converter 82, and outputs it to the speed-position converter 84. The speed-position converter 84 (master side) updates the positional instruction value $x_{dm}$ of the master arm 2 based on the corrected speed instruction value $v_d$, and outputs it to the master-side control part 12. Thus, the reaction force $f_s$ of the slave arm 1 is reflected in the positional instruction value $x_{dm}$ of the master arm 2.

Next, operation of the robot system is described with reference to the drawings. As illustrated in FIG. 1, in the robot system 100, the operator gives a desired manipulating force to the control lever 21 of the master arm 2, while looking at the image of the camera 5 projected on the monitor 6, as the input of the operational information. According to the manipulating force, the slave arm 1 operates along with the master arm 2. That is, by the operator operating the control lever 21 while looking at the monitor 6, the master arm 2 and the slave arm 1 operate as the operator desires. Suppose a case where the fitting component W1 which is the workpiece held by the end effector 7 of the slave arm 1 contacts the object which is the to-be-fitted component W2. FIG. 3(a) is a graph schematically illustrating a temporal change of the reaction force $f_s$ detected by the force sensor 4 of the slave arm 1. At a time t0, the reaction force $f_s$ detected by the force sensor 4 of the slave arm 1 rises rapidly. The exaggerated expresser 9 exaggeratedly presents the operating feel to the operator who operates the control lever 21 in the reaction-force sudden change state in which the reaction force $f_s$ detected by the force sensor 4 of the slave arm 1 changes rapidly with time (refer to FIG. 2). For example, the exaggerated expresser 9 may determine that it is in the reaction-force sudden change state when the reaction force $f_s$ is above a given value stored beforehand in the memory, or may determine that it is in the reaction-force sudden change state whether an amount of change in the reaction force $f_s$ within a minute time $\Delta t$ is positive. In the reaction-force sudden change state, the exaggerated expresser 9 generates the correction component for correcting the positional instruction value $x_{dm}$ of the master arm 2 based on the reaction force $f_s$, and outputs it to the adder/subtractor 85. The adder/subtractor 85 adds the correction component generated by the exaggerated expresser 9 to the speed instruction value $v_d$ generated by the force-speed converter 82, and outputs it to the speed-position converter 84. The speed-position converter 84 (master side) updates the positional instruction value $x_{dm}$ of the master arm 2 based on the corrected speed instruction value $v_d$, and outputs it to the master-side control part 12. Thus, since the reaction force $f_s$ of the slave arm 1 is reflected in the positional instruction value $x_{dm}$ of the master arm 2, the operator can recognize that the end effector 7 of the slave arm 1 contacted the object. Therefore, the fine sense at high frequency can be presented in the parallel type bilateral control.

In this embodiment, the exaggerated expresser 9 can generate various correction components according to the nature of the work object. FIGS. 3(b) to 3(d) are graphs illustrating temporal changes of the correction components. FIG. 3(b) illustrates a case where the correction component is a triangular wave component. As illustrated in FIG. 3(b), the exaggerated expresser 9 generates the triangular wave component for one cycle as the correction component in the reaction-force sudden change state. Note that, although a period corresponding to one cycle of the triangular wave component is, for example, 40 msec, it may have a length to the extent that the operator can perceive. The adder/subtractor 85 adds the correction component generated by the exaggerated expresser 9 to the speed instruction value $v_d$ generated by the force-speed converter 82, and outputs it to the speed-position converter 84. The speed-position converter 84 (master side) updates the positional instruction value $x_{dm}$ of the master arm 2 based on the corrected speed instruction value $v_d$, and outputs it to the master-side control part 12. By using the triangular wave component as the correction component, the sense of the slave arm 1 hitting a hard object can be exaggeratedly presented to the operator who operates the master arm 2.

FIG. 3(c) illustrates a case where the correction component is a sine wave component. As illustrated in FIG. 3(c), the exaggerated expresser 9 generates the sine wave component for one cycle as the correction component in the reaction-force sudden change state. The adder/subtractor 85 adds the correction component generated by the exaggerated expresser 9 to the speed instruction value $v_d$ generated by the force-speed converter 82, and outputs it to the speed-position converter 84. The speed-position converter 84 (master side) updates the positional instruction value $x_{dm}$ of the master arm 2 based on the corrected speed instruction value $v_d$, and outputs it to the master-side control part 12. By using the sine wave component as the correction component, the sense of the slave arm 1 hitting a soft object can be exaggeratedly presented to the operator who operates the master arm 2.

Figure 3:
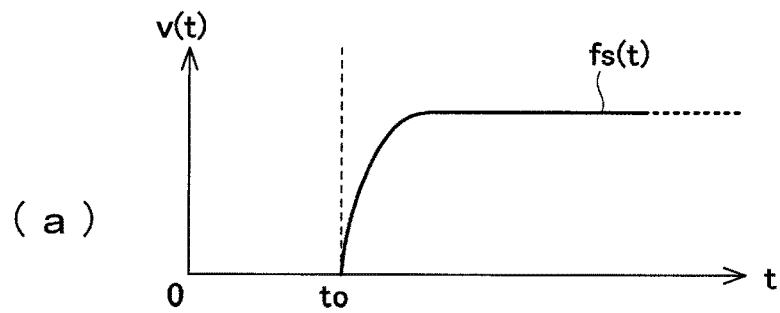
FIGS. 3(a) to 3(d) are graphs illustrating a reaction force, and temporal changes in a correction component generated by an exaggerated expresser.
Figure 3:
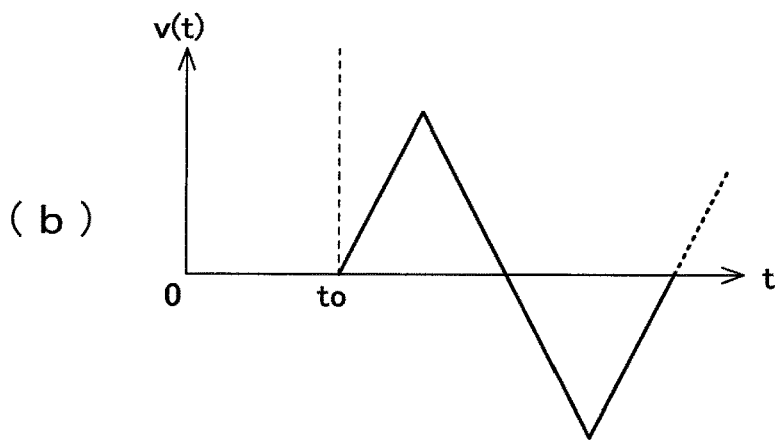
Figure 3:
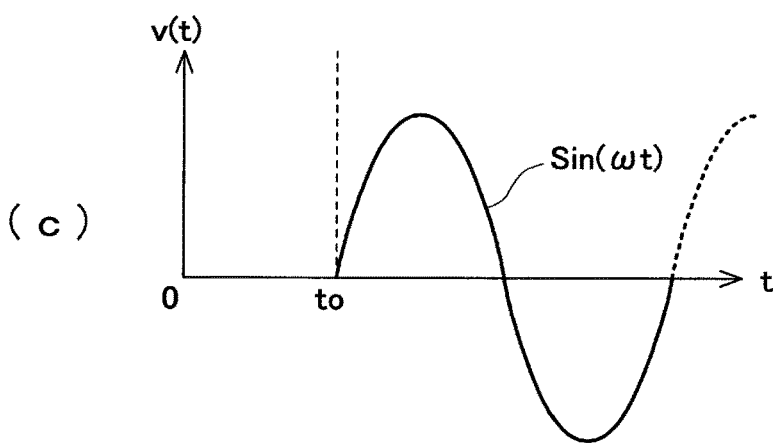
Figure 3:
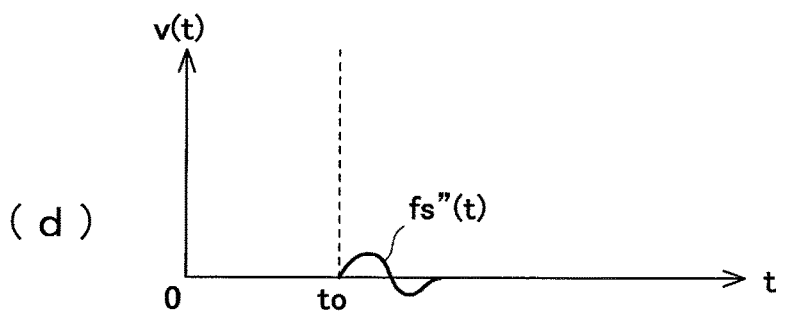

FIG. 3(*d*) illustrates a case where the correction component is a second order derivative value of the reaction force $f_s$ with respect to the time t. As illustrated in FIG. 3(*d*), the exaggerated expresser 9 generates a component corresponding to one cycle of the triangular wave component or the sine wave component as the correction component in the reaction-force sudden change state. The adder/subtractor 85 adds the correction component generated by the exaggerated expresser 9 to the speed instruction value $v_d$ generated by the force-speed converter 82, and outputs it to the speed-position converter 84. The speed-position converter 84 (master side) updates the positional instruction value $x_{dm}$ of the master arm 2 based on the corrected speed instruction value $v_d$, and outputs it to the master-side control part 12. By using the second order derivative value of the reaction force $f_s$ with respect to the time t as the correction component, the sense of the slave arm 1 actually hitting the object can be exaggeratedly presented to the operator who operates the master arm 2.

Second Embodiment

Next, a second embodiment is described. A fundamental configuration of a robot system of this embodiment is similar to that of the first embodiment. Below, description of the configuration common to the first embodiment is omitted, and only a different configuration is described.

Figure 4:
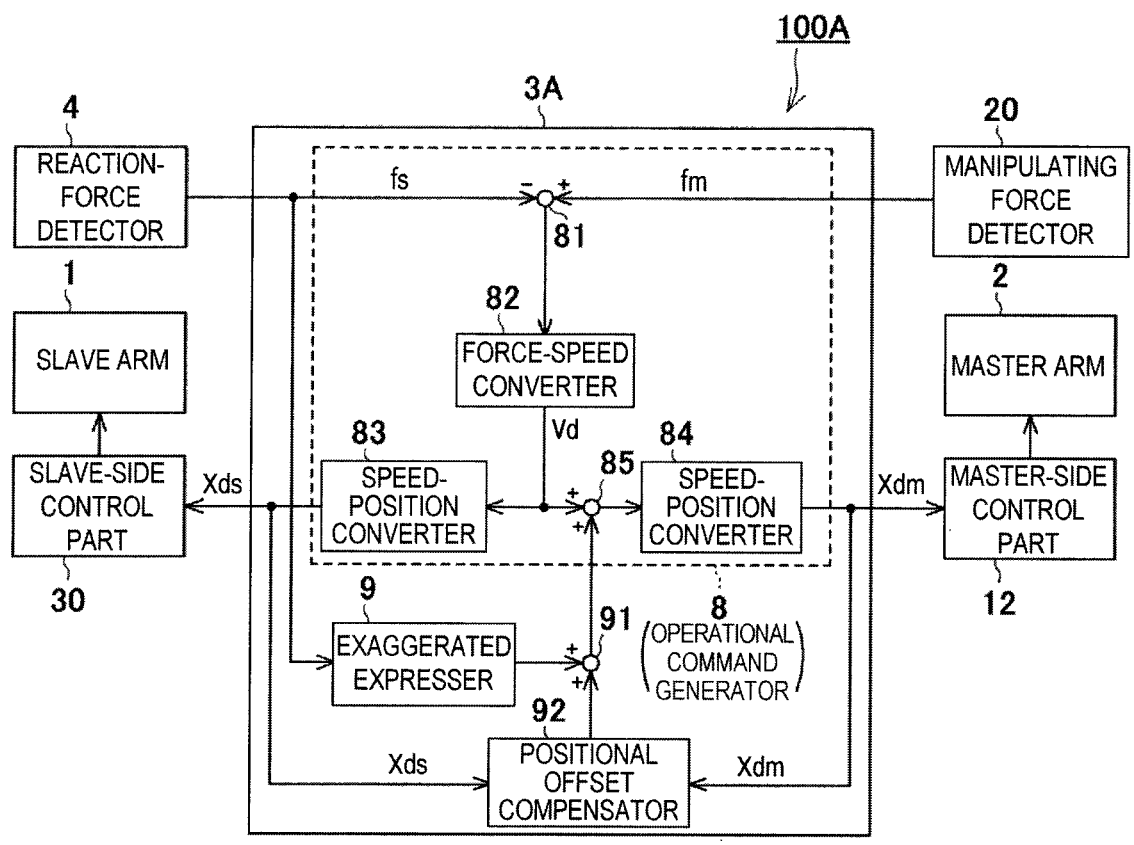
FIG. 4 is a block diagram illustrating a configuration of a control system of a robot system according to a second embodiment of the present disclosure.

FIG. 4 is a block diagram illustrating a configuration of a control system of the robot system according to the second embodiment of the present disclosure. As illustrated in FIG. 4, in a robot system 100A of this embodiment, it differs from the first embodiment in that a control device 3A is further provided with a positional offset compensator 92 and an adder/subtractor 91.

The positional offset compensator 92 generates a compensation component for compensating an offset in the spatial relationship between the slave arm 1 and the master arm 2 based on positional information on the slave arm 1, and positional information on the master arm 2 considering the correction component. In detail, the positional offset compensator 92 calculates an integrated value of a deviation of the positional instruction value $x_{dm}$ of the master arm considering the correction component from the positional instruction value $x_{ds}$ of the slave arm to generate the compensation component for compensating the positional instruction value $x_{dm}$ of the master arm 2.

The adder/subtractor 91 adds the compensation component generated by the positional offset compensator 92 to the correction component generated by the exaggerated expresser 9, and outputs it to the adder/subtractor 85. The adder/subtractor 85 adds the correction component generated by the exaggerated expresser 9 considering the compensation component of the positional offset to the speed instruction value $v_d$ generated by the force-speed converter 82, and outputs it to the speed-position converter 84. The speed-position converter 84 (master side) updates the positional instruction value $x_{dm}$ of the master arm 2 based on the corrected and compensated speed instruction value $v_d$, and outputs it to the master-side control part 12. Therefore, in the parallel type bilateral control, the offset in the spatial relationship between the master arm 2 and the slave arm 1 caused by the exaggerated expresser 9 can be compensated gradually. Since the master arm 2 is compensated while moving slowly after the operating feel is exaggeratedly presented so that the operator does not sense any uncomfortableness, it does not affect the operation of the master arm 2.

Note that, in this embodiment, although the positional offset compensator 92 calculates, based on the positional instruction value $x_{ds}$ of the slave arm 1, and the positional instruction value $x_{dm}$ of the master arm 2 considering the correction component, the integrated value of the deviation of one value from another, the detection value (actually value) of the encoder which detects the rotational angle position of the servo motor provided to each joint may be used, as long as it is the positional information on the slave arm 1 and the master arm 2.

Third Embodiment

Next, a third embodiment is described. A fundamental configuration of a robot system of this embodiment is similar to that of the above embodiments. Below, description of the configuration common to the above embodiments is omitted, and only a different configuration is described.

Figure 5:
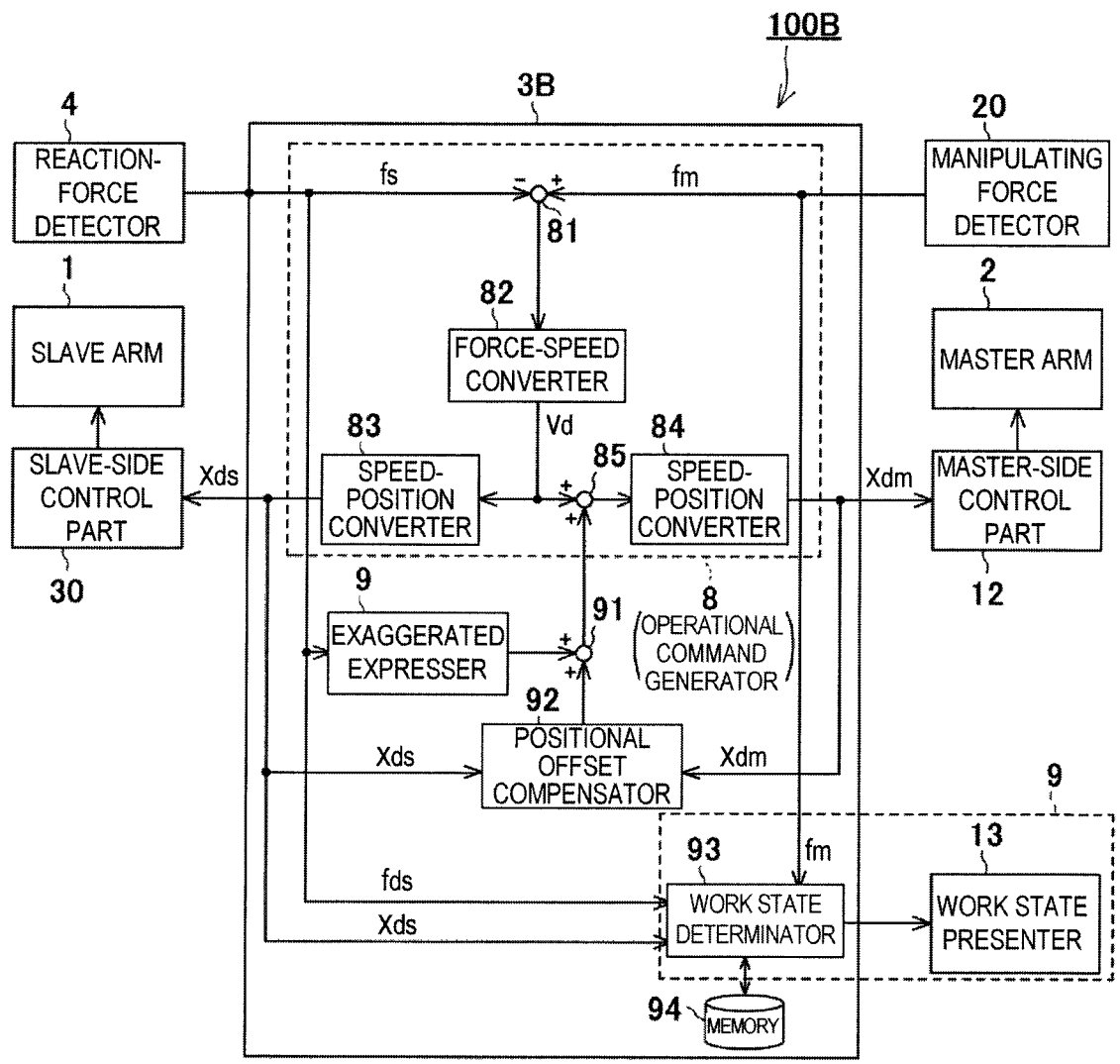
FIG. 5 is a block diagram illustrating a configuration of a control system of a robot system according to a third embodiment of the present disclosure.

FIG. 5 is a block diagram illustrating a configuration of a control system of the robot system according to the third embodiment of the present disclosure. As illustrated in FIG. 5, a robot system 100B of this embodiment differs from the second embodiment (FIG. 4) in that the exaggerated expresser 9 of a control device 3B is further provided with a work state determinator 93 and a work state presenter 13.

In this embodiment, for a particular work, the positional instruction value $x_{ds}$ of the slave arm 1, the manipulating force $f_m$ of the master arm 2, and the reaction force $f_s$ of the slave arm 1 are collected as data, at least one work states are classified according to the collected data, and the classified work states are stored beforehand. The particular work is a work in which the fitting component W1 which is the workpiece held by the end effector 7 is fitted into the hole of the to-be-fitted component W2 which is the target object. The work state includes a state where the work is started, a state where the object is explored, and a state where the workpiece is inserted into the object.

The work state determinator 93 determines, during the operation of the robot system 100B, which work state stored in the memory 94 the current work state is classified based on at least one value among the positional instruction value $x_{ds}$ of the slave arm 1, the manipulating force $f_m$ of the master arm 2, and the reaction force $f_s$ of the slave arm 1. In this embodiment, the work state determinator 93 determines whether the current work state is classified in any one of the work states of the state where the work is started, the state where the object is explored, and the state where the workpiece is inserted into the object. The work state presenter 13 is configured to present the operator the work state by at least one of sound, vibration of the master arm, and light.

Figure 6:
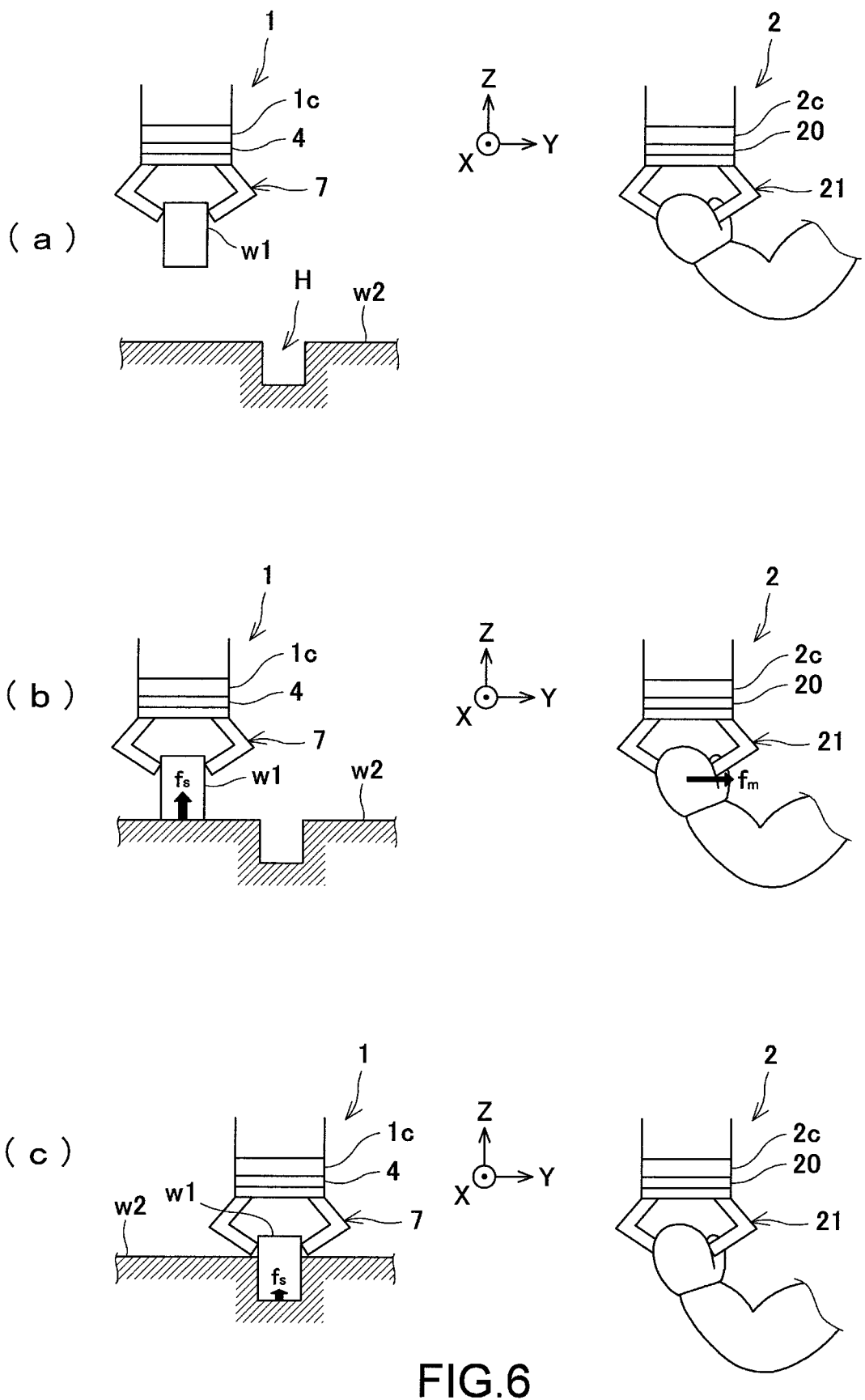
FIGS. 6(a) to 6(c) are schematic diagrams each illustrating one example of operation of the robot system.

Next, operation of the robot system 100B of this embodiment is described using the drawings. As illustrated in FIGS. 6(*a*) to 6(*c*), the wrist coordinate system of the slave arm 1 defines X-axis and Y-axis in parallel with an attached surface of the wrist 1*c*, and defines Z-axis in a direction perpendicular to the attached surface. The wrist coordinate system of the master arm 2 defines X-axis and Y-axis in parallel with an attached surface of a wrist 2*c*, and defines Z-axis in a direction perpendicular to the attached surface. As illustrated in FIG. 6(a), in the robot system 100B, the operator gives a desired manipulating force to the control lever 21 of the master arm 2 as the input of the operational information, while looking at the image of the camera 5 projected on the monitor 6. According to the manipulating force, the slave arm 1 operates along with the master arm 2. The operator operates the control lever 21 while looking at the monitor 6 so that the fitting component W1 which is the workpiece held by the end effector 7 is inserted into a hole H of the to-be-fitted component W2 which is the target object.

First, it is assumed that the fitting component W1 which is the workpiece held by the end effector 7 of the slave arm 1 contacts the object which is the to-be-fitted component W2. For example, the exaggerated expresser 9 may determine that it is in the reaction-force sudden change state when the reaction force $f_s$ is above the given value stored beforehand in the memory, or may determine that it is in the reaction-force sudden change state whether the amount of change in the reaction force $f_s$ within the minute time Δt is positive (refer to FIG. 5). The exaggerated expresser 9 exaggeratedly presents the operating feel to the operator who operates the control lever 21 in the reaction-force sudden change state which is the state in which the reaction force $f_s$ detected by the force sensor 4 of the slave arm 1 changes rapidly with time. Since the exaggerated expresser 9 generates, in the reaction-force sudden change state, the correction component for correcting the positional instruction value $x_{dm}$ of the master arm 2 based on the reaction force $f_s$ to reflect the reaction force $f_s$ of the slave arm 1 in the positional instruction value $x_{dm}$ of the master arm 2, the operator can recognize that the end effector 7 of the slave arm 1 contacted the object.

Moreover, in this embodiment, the work state determinator 93 takes the reaction-force sudden change state as in the state where the work is started (refer to FIG. 5). Then, the work state presenter 13 presents the operator who operates the master arm this state by vibration of a vibrating motor. Alternatively, the state may be recognized by the operator visually by light. Therefore, the fine sense at high frequency, which cannot be covered by the response speed of the master can be presented.

The operator proceeds the work. As illustrated in FIG. 6(b), when the operator operates the control lever 21 sideways, a sideway manipulating force $f_m$ parallel to the XY plane in the wrist coordinate system of the master arm 2 is given to the control lever 21. Therefore, the fitting component W1 held by the end effector 7 moves toward the fitting hole H of the to-be-fitted component W2, while maintaining a state where the fitting component W1 contacts the to-be-fitted component W2. At this time, the reaction force $f_s$ of the slave arm 1 which grips the fitting component W1 is generated upwardly (the positive direction of the Z-axis in this figure), and the manipulating force $f_m$ of the master arm 2 is generated in a sideway direction (the positive direction of the Y-axis in this figure). The work state determinator 93 determines that such a work state is a state where the fitting component W1 explores (searches) the object, based on the reaction force $f_s$ of the slave arm 1 and the manipulating force $f_m$ of the master arm 2. Then, the work state presenter 13 presents the operator this state by crunch sound. Therefore, the fine sense at high frequency, which cannot be covered by the response speed of the master can be presented.

The operator continues the operation of the control lever 21 in a given sideway direction, as illustrated in FIG. 6(c). Then, the fitting component W1 held by the end effector 7 is inserted into the fitting hole H of the to-be-fitted component W2. At this time, the position of the slave arm 1 which grips the workpiece is located below (the negative direction of the Z-axis in this figure) a given position (in this figure, the surface of the to-be-fitted component W2), and the reaction force $f_s$ of the slave arm 1 varies. The magnitude of the reaction force $f_s$ of the slave arm 1 decreases from the exploring state. The work state determinator 93 determines that such a work state is the (inserted) state where the workpiece was inserted into the object based on the positional instruction value $x_{ds}$ of the slave arm 1, and the reaction force $f_s$ of the slave arm. Then, the work state presenter 13 presents the operator the state where the workpiece is inserted into the object by sound. The work state presenter 13 presents the operator this state by, for example, sliding sound from the speaker. Therefore, the fine sense at high frequency, which cannot be covered by the response speed of the master can be presented.

According to this embodiment, the operator can recognize that the workpiece held by the end effector 7 of the slave arm 1 contacted the object, and can also accurately recognize the state of the work which is started after the contact. Note that the effect of the exaggerated expresser 9 of this embodiment can be acquired, even if the control device 3B is not provided with the positional offset compensator 92 and the adder/subtractor 91.

Other Embodiments

Note that, although the particular work performed by the robot system of each of the above embodiments is the work to insert the fitting component W1 which is the workpiece held by the end effector 7 into the hole of the to-be-fitted component W2 which is the target object, it is not limited to this configuration. For example, the robot system may be a surgical operation system and the end effector may be a surgical instrument. In such a system, a surgeon operates the master arm 2, while looking at an endoscope image. The particular work is assumed to be a work in which the surgical instrument attached to the tip end of the slave arm 1 advances inside the gel-like human body, while receiving some reaction force, and a medical treatment is conducted in a state where the surgical instrument contacts a bone which is the object.

Moreover, although the state where the work is started, the state where the object is explored, and the state where the workpiece is inserted into the object are illustrated as the work state determined by the work state determinator 93, it is not limited to this configuration, and other work states may be determined according to the particular work.

Note that, although in each of the above embodiments each of the master operating command and the slave operating command is the positional instruction of the servo motor which drives each joint axis of each arm, it may be a torque instruction of the servo motor which drives each joint axis, without being limited to the configuration.

It is apparent for a person skilled in the art that many improvements and other embodiments of the present disclosure are possible from the above description. Therefore, the above description is to be interpreted only as illustration, and it is provided in order to teach a person skilled in the art the best mode that implements the present disclosure. The details of the structures and/or the functions may be changed substantially, without departing from the spirit of the present disclosure.

INDUSTRIAL APPLICABILITY

The present disclosure is useful for the master-slave type robot systems.

DESCRIPTION OF REFERENCE CHARACTERS

1 Slave Arm
2 Master Arm
3, 3A, 3B Control Device
4 Force Sensor (Slave Side)
5 Camera
6 Monitor
7 End Effector
8 Operational Command Generator
9 Exaggerated Expresser
12 Master-Side Control Part (Master Side)
20 Force Sensor (Master Side)
30 Slave-Side Control Part (Slave Side)
100, 100A, 100B Robot System

What is claimed is:

1. A robot system, comprising:
a master arm having an operation end;
a slave arm having a work end;
a first sensor that detects a manipulating force given to the operation end by an operator;
a second sensor that detects a reaction force given to the work end or a workpiece held by the work end;
a first controller that generates an operating command of the master arm and generates an operating command of the slave arm based on the manipulating force and the reaction force;
a second controller that controls the master arm based on the operating command of the master arm generated by the first controller; and
a third controller that controls the slave arm based on the operating command of the slave arm generated by the first controller,
wherein the first controller exaggeratedly presents an operating feel to the operator who operates the operation end in a reaction-force sudden change state that is a state in which the reaction force changes rapidly with time,
as a result of the first controller determining that the reaction-force sudden change state is not occurring, the first controller generates a first operating command of the master arm based on a result of calculation between the manipulating force and the reaction force and outputs the first operating command to the second controller, and
as a result of the first controller determining that the reaction-force sudden change state is occurring, the first controller generates a second operating command of the master arm based on a result of calculation in which a correction component based on the reaction force is further added to the result of calculation between the manipulating force and the reaction force, and the first controller outputs the second operating command to the second controller.

2. The robot system of claim 1, wherein the correction component is a triangular wave component.

3. The robot system of claim 1, wherein the correction component is a sine wave component.

4. The robot system of claim 1, wherein the correction component is a second order derivative value of the reaction force with respect to time.

5. The robot system of claim 1, wherein the operating command is a positional instruction.

6. The robot system of claim 5, wherein the first controller generates a compensation component to compensate an offset in a spatial relationship between the slave arm and the master arm based on positional information on the slave arm, and positional information on the master arm considering the correction component.

7. The robot system of claim 1, further comprising:
a memory storing classified work states, wherein positional information on the slave arm, the manipulating force, and the reaction force in a particular work of the robot system are collected as data, and one or more work states are classified according to the collected data,
wherein the first controller determines, during operation of the robot system, which work state stored in the memory a current work state is classified based on at least one value among the positional information on the slave arm, the manipulating force, and the reaction force.

8. The robot system of claim 7, wherein the first controller determines, during the operation of the robot system, that a work state in which the reaction force occurs in a given direction and the manipulating force occurs in a direction perpendicular to the given direction is a state where an object is searched.

9. The robot system of claim 7, wherein the first controller determines, during the operation of the robot system, that the work state is a state where the workpiece held by the work end is inserted into an object when the positional information on the slave arm is located in a given direction from a given position, and the reaction force varies.

10. The robot system of claim 7, wherein the first controller presents the operator the work state by at least one of sound, vibration of the master arm, and light.

11. A method of controlling a robot system, the robot system including:
a master arm having an operation end;
a slave arm having a work end;
a first sensor that detects a manipulating force given to the operation end by an operator;
a second sensor that detects a reaction force given to the work end or a workpiece held by the work end;
a first controller that generates an operating command of the master arm and generates an operating command of the slave arm based on the manipulating force and the reaction force;
a second controller that controls the master arm based on the operating command of the master arm generated by the first controller; and
a third controller that controls the slave arm based on the operating command of the slave arm generated by the first controller,
the method comprising:
exaggeratedly presenting, by the first controller, an operating feel to the operator who operates the operation end in a reaction-force sudden change state that is a state in which the reaction force changes rapidly with time;
as a result of the first controller determining that the reaction-force sudden change state is not occurring, by the first controller, generating a first operating command of the master arm based on a result of calculation between the manipulating force and the reaction force and outputting the first operating command to the second controller; and as a result of the first controller determining that the reaction-force sudden change state is occurring, by the first controller, generating a correction component based on the reaction force, generating a second operating command of the master arm based on a result of calculation in which the correction component is further added to the result of calculation between the manipulating force and the reaction force, and outputting the second operating command to the second controller.

12. The robot system of claim 2, further comprising:
a memory storing classified work states, wherein positional information on the slave arm, the manipulating force, and the reaction force in a particular work of the robot system are collected as data, and one or more work states are classified according to the collected data,
wherein the first controller determines, during operation of the robot system, which work state stored in the memory a current work state is classified based on at least one value among the positional information on the slave arm, the manipulating force, and the reaction force.

13. The robot system of claim 3, further comprising:
a memory storing classified work states, wherein positional information on the slave arm, the manipulating force, and the reaction force in a particular work of the robot system are collected as data, and one or more work states are classified according to the collected data,
wherein the first controller determines, during operation of the robot system, which work state stored in the memory a current work state is classified based on at least one value among the positional information on the slave arm, the manipulating force, and the reaction force.

14. The robot system of claim 4, further comprising:
a memory storing classified work states, wherein positional information on the slave arm, the manipulating force, and the reaction force in a particular work of the robot system are collected as data, and one or more work states are classified according to the collected data,
wherein the first controller determines, during operation of the robot system, which work state stored in the memory a current work state is classified based on at least one value among the positional information on the slave arm, the manipulating force, and the reaction force.

15. The robot system of claim 5, further comprising:
a memory storing classified work states, wherein positional information on the slave arm, the manipulating force, and the reaction force in a particular work of the robot system are collected as data, and one or more work states are classified according to the collected data,
wherein the first controller determines, during operation of the robot system, which work state stored in the memory a current work state is classified based on at least one value among the positional information on the slave arm, the manipulating force, and the reaction force.

16. The robot system of claim 6, further comprising:
a memory storing classified work states, wherein positional information on the slave arm, the manipulating force, and the reaction force in a particular work of the robot system are collected as data, and one or more work states are classified according to the collected data,
wherein the first controller determines, during operation of the robot system, which work state stored in the memory a current work state is classified based on at least one value among the positional information on the slave arm, the manipulating force, and the reaction force.

17. The robot system of claim 8, wherein the first controller presents the operator the work state by at least one of sound, vibration of the master arm, and light.

18. The robot system of claim 9, wherein the first controller presents the operator the work state by at least one of sound, vibration of the master arm, and light.

19. A robot system, comprising:
a master arm having an operation end;
a slave arm having a work end;
a first sensor that detects a manipulating force given to the operation end by an operator;
a second sensor that detects a reaction force given to the work end or a workpiece held by the work end;
a first controller that generates an operating command of the master arm and generates an operating command of the slave arm based on the manipulating force and the reaction force;
a second controller that controls the master arm based on the operating command of the master arm generated by the first controller; and
a third controller that controls the slave arm based on the operating command of the slave arm generated by the first controller,
wherein the first controller exaggeratedly presents an operating feel to the operator who operates the operation end in a reaction-force sudden change state that is a state in which the reaction force changes rapidly with time,
wherein the first controller generates a correction component to correct the operating command of the master arm generated by the first controller based on the reaction force in the reaction-force sudden change state, and
wherein the correction component is a second order derivative value of the reaction force with respect to time.

20. A robot system, comprising:
a master arm having an operation end;
a slave arm having a work end;
a first sensor that detects a manipulating force given to the operation end by an operator;
a second sensor that detects a reaction force given to the work end or a workpiece held by the work end;
a first controller that generates an operating command of the master arm and generates an operating command of the slave arm based on the manipulating force and the reaction force;
a second controller that controls the master arm based on the operating command of the master arm generated by the first controller;
a third controller that controls the slave arm based on the operating command of the slave arm generated by the first controller; and
a memory storing classified work states, wherein positional information on the slave arm, the manipulating force, and the reaction force in a particular work of the robot system are collected as data, and one or more work states are classified according to the collected data, wherein the first controller exaggeratedly presents an operating feel to the operator who operates the operation end in a reaction-force sudden change state that is a state in which the reaction force changes rapidly with time, wherein the first controller determines, during operation of the robot system, which work state stored in the memory a current work state is classified based on at least one value among the positional information on the slave arm, the manipulating force, and the reaction force, and wherein the first controller determines, during the operation of the robot system, that a work state in which the reaction force occurs in a given direction and the manipulating force occurs in a direction perpendicular to the given direction is a state where an object is searched.

* * * * *